United States Patent
Seo et al.

(10) Patent No.: US 9,963,055 B2
(45) Date of Patent: May 8, 2018

(54) LEG REST APPARATUS FOR VEHICLE SEAT

(71) Applicant: HYUNDAI DYMOS INCORPORATED, Seosan-si, Chungcheongnam-do (KR)

(72) Inventors: Jin Ho Seo, Yongin-si (KR); Jun Kyu Kim, Hwaseong-si (KR); Myeong Sub Kim, Seongnam-si (KR); Yun Ho Kim, Osan-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 0 days. days.

(21) Appl. No.: 15/372,546

(22) Filed: Dec. 8, 2016

(65) Prior Publication Data
US 2017/0182915 A1    Jun. 29, 2017

(30) Foreign Application Priority Data
Dec. 24, 2015    (KR) .......................... 10-2015-0185817

(51) Int. Cl.
*B60N 2/34*    (2006.01)
*B60N 2/44*    (2006.01)
*B60N 2/02*    (2006.01)

(52) U.S. Cl.
CPC ......... *B60N 2/4495* (2013.01); *B60N 2/0232* (2013.01); *B60N 2/995* (2018.02)

(58) Field of Classification Search
CPC ............................. B60N 2/0232; B60N 2/4495
USPC ...................................... 297/423.26, 423.28
See application file for complete search history.

(56) References Cited

U.S. PATENT DOCUMENTS

| 5,352,020 | A | * | 10/1994 | Wade | B60N 2/4495 |
| | | | | | 297/423.26 X |
| 5,505,519 | A | * | 4/1996 | Natt | B60N 2/28 |
| | | | | | 297/423.26 X |
| 6,095,610 | A | * | 8/2000 | Okajima | B60N 2/4495 |
| | | | | | 297/423.26 X |
| 6,695,406 | B2 | * | 2/2004 | Plant | B60N 2/34 |
| | | | | | 297/423.26 |
| 7,866,755 | B2 | * | 1/2011 | Okano | B60N 2/4495 |
| | | | | | 297/423.26 X |
| 8,708,417 | B2 | * | 4/2014 | Mejuhas | B60N 2/62 |
| | | | | | 297/423.23 |
| 8,944,513 | B2 | * | 2/2015 | Suzuki | B60N 2/4495 |
| | | | | | 297/423.26 |
| 9,408,472 | B2 | * | 8/2016 | Kim | B64D 11/0643 |

(Continued)

FOREIGN PATENT DOCUMENTS

| KR | 10-1232076 B1 | 2/2013 |
| KR | 10-2013-0073221 A | 7/2013 |
| KR | 10-1518559 | 4/2015 |

*Primary Examiner* — Rodney B White
(74) *Attorney, Agent, or Firm* — Brinks Gilson & Lione (57) ABSTRACT

The present disclosure provides a leg rest apparatus for a vehicle seat, which is tilted in forward and backward directions with a pivot bracket. The leg rest apparatus includes: a base bracket coupled to a seat cushion frame in front of a seat cushion; a pivot bracket installed to vertically pivot relative to the front of the base bracket; and a tilt unit tilting the pivot bracket in forward and backward directions of a base bracket by using that the center of gravity of the pivot bracket is changed by pivoting of the pivot bracket by mediating the base bracket and the pivot bracket.

5 Claims, 6 Drawing Sheets

(56) References Cited

U.S. PATENT DOCUMENTS

| | | | | |
|---|---|---|---|---|
| 9,821,692 | B2* | 11/2017 | Vyskocil | B60N 2/4495 |
| 2001/0033101 | A1* | 10/2001 | Plant | A47C 1/0352 |
| | | | | 297/342 |
| 2013/0045825 | A1* | 2/2013 | Yin | A47C 7/506 |
| | | | | 474/150 |
| 2014/0021765 | A1* | 1/2014 | Suzuki | B60N 3/063 |
| | | | | 297/423.19 |
| 2014/0333111 | A1* | 11/2014 | Besler | A47C 7/506 |
| | | | | 297/423.26 |
| 2016/0331609 | A1* | 11/2016 | Cheng | B60N 3/063 |
| 2017/0174105 | A1* | 6/2017 | An | B60N 2/4495 |

\* cited by examiner

LEG REST APPARATUS FOR VEHICLE SEAT

CROSS-REFERENCE TO RELATED APPLICATION

This application claims priority to and the benefit of Korean Patent Application No. 10-2015-0185817, filed on Dec. 24, 2015, which is incorporated herein by reference in its entirety.

FIELD

The present disclosure relates to a leg rest apparatus for a vehicle seat.

BACKGROUND

The statements in this section merely provide background information related to the present disclosure and may not constitute prior art.

A leg rest apparatus is a convenient apparatus to improve a passenger's comfort. The leg rest apparatus is connected to a seat of a vehicle to support legs of a passenger.

The leg rest apparatus generally has a cushion similar to a seat cushion and is provided in front of the seat cushion on which the passenger sits. And thus, when the leg rest apparatus is not thus used, the leg rest apparatus can be folded into under the seat cushion. The folded leg rest apparatus can pivot and be disposed in front of the seat cushion by an operation by the passenger to support the legs of the passenger.

However, we have discovered that while the leg rest apparatus pivots, the cushion of the leg rest apparatus interferes with the seat cushion and is deformed. In order to avoid the interference, a spare space between the seat cushion and the cushion of the leg rest apparatus can be formed so as to allow the leg rest apparatus to pivot in the spare space. With this arrangement, however, we have found that the leg rest apparatus occupies a space which is more than needed.

SUMMARY

The present disclosure provides a leg rest apparatus for a vehicle seat, which is tilted in forward and backward directions by movement of the center of gravity of a pivot bracket which is changed with vertical pivot of the pivot bracket.

Further, the present disclosure provides a leg rest apparatus for a vehicle seat, which reduces a speed at which the pivot bracket is tilted in the forward and backward direction.

An exemplary form of the present disclosure provides a leg rest apparatus for a vehicle seat, including: a base bracket coupled to a seat cushion frame in front of a seat cushion; a pivot bracket configured to vertically pivot relative to the front of the base bracket; and a tilt unit configured to tilt the pivot bracket in forward and backward directions of the base bracket by using that the center of gravity of the pivot bracket is changed by pivoting of the pivot bracket by mediating the base bracket and the pivot bracket.

A pair of fixation brackets may be provided in front of the base bracket and extend downward while the fixation brackets are spaced from each other, and a pair of guide brackets may be provided. The pair of guide brackets extend forward at both edges of the base bracket, and the tilt unit may include a pair of tilt brackets of which lower areas are installed on the bottoms of the fixation brackets by a tilt shaft and of which upper areas are tilted while being guided along the guide brackets. The pivot bracket may be connected to a front part of the upper areas of the tilt brackets.

An arc-shaped first guide hole may be formed in each guide bracket along the forward and backward directions, and a first guide bolt is configured to insert into the arc-shaped first guide hole. The first guide bolt is guided along the arc-shaped first guide hole and may be provided in the upper area of the tilt bracket.

A pair of extension brackets may be provided in the rear of the pivot bracket and extend downward while being spaced from each other, and the tilt unit may further include a pair of link brackets configured to connect the extension brackets to the fixation brackets, forming a link structure. The operation of the link brackets may be controlled by the tilt brackets so that a speed at which the link brackets operate is lower than a speed at which the tilt brackets are tilted while the tilt brackets are tilted in the forward and backward directions.

The leg rest apparatus may further include: an arc-shaped second guide hole which may be vertically formed in the tilt brackets, and a second guide bolt which is inserted into the arc-shaped second guide hole and guided along the arc-shaped second guide hole. The second guide bolt may be provided in a middle area of the link brackets.

The present disclosure provides a means for tilting a pivot bracket in forward and backward directions by using that the center of gravity of a pivot bracket is changed without using a separate power source when the pivot bracket pivots, and as a result, interference does not occur between a cushion provided in the pivot bracket and a seat cushion on which a passenger sits.

Further, the present disclosure provides a means for reducing a speed at which a tilt bracket is tilted while the tilt bracket tilting the pivot bracket in the forward and backward directions to control the speed at which the tilt bracket is tilted, thereby enhancing marketability of a leg rest apparatus.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

However, the present disclosure is not limited to the exemplary form set forth below, and will be embodied in various different forms. The present exemplary forms are just for rendering the description of the present disclosure complete and are set forth to provide a complete understanding of the scope of the present disclosure to a person with ordinary skill in the technical field to which the present disclosure pertains.

Figure 1:
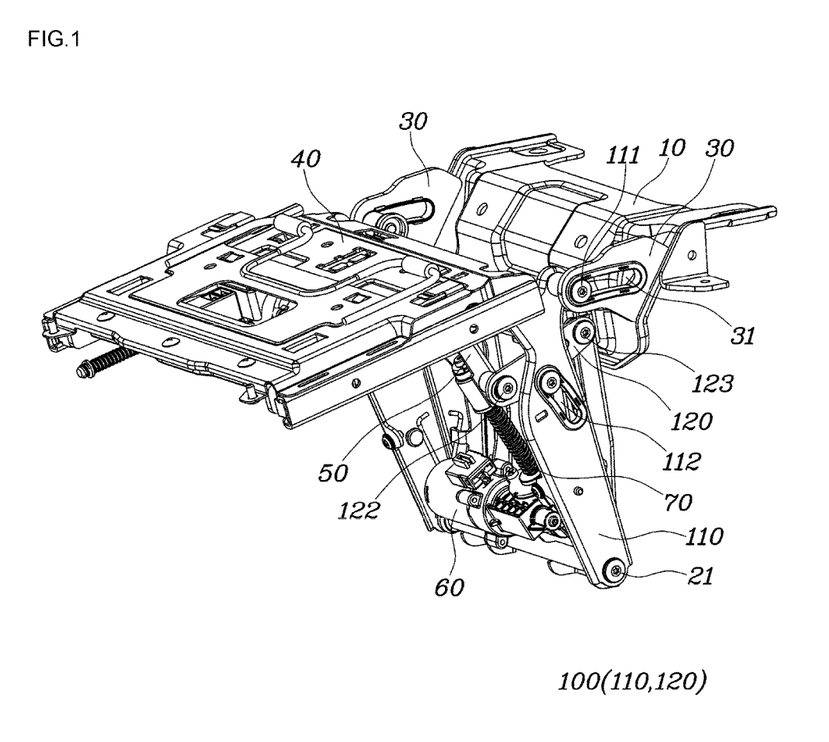
FIGS. 1 and 2 are perspective views illustrating a leg rest apparatus for a vehicle seat.
Figure 2:
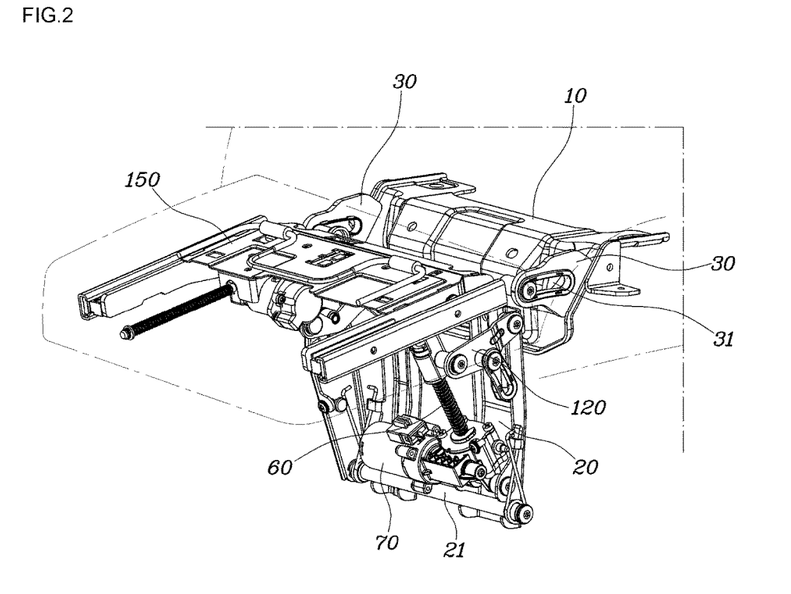
Figure 3:
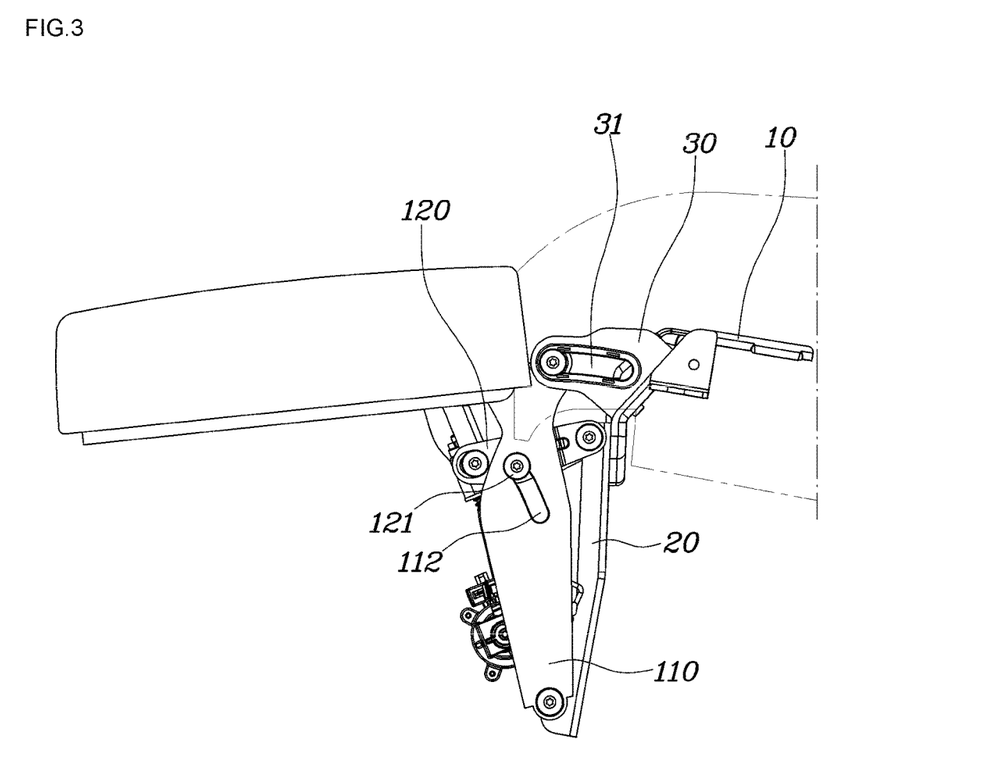
FIG. 3 is a side view illustrating the leg rest apparatus for a vehicle seat.

FIGS. 1 and 2 are perspective views illustrating a leg rest apparatus for a vehicle seat in one exemplary form of the present disclosure, and FIG. 3 is a side view illustrating the leg rest apparatus for a vehicle seat in one form of the present disclosure.

As illustrated in FIGS. 1 to 3, the leg rest apparatus for a vehicle seat includes: a base bracket 10 coupled to a seat cushion frame in front of a seat cushion; a pivot bracket 40 configured to vertically pivot relative to the base bracket 10; and a tilt unit 100 tilting the pivot bracket 40 in forward and backward directions of the base bracket 10 by using that the center of gravity of the pivot bracket 40 is changed by pivoting of the pivot bracket 40 by mediating the base bracket 10 and the pivot bracket 40.

The base bracket 10 is a fixed component so that that the base bracket 10 does neither vertically pivot nor slide in the forward and backward directions. As the base bracket 10 is bent in a ㄱ shape, the top end portion of the base bracket 10 is fixedly coupled to the seat cushion frame at a front center of the seat cushion and a front end of the bottom portion of the base bracket 10 faces a floor panel.

The pivot bracket 40 is pivotably connected to the base bracket 10 via the tilt unit 100, and a cushion on which legs of a user are seated may be attached to the top of the pivot bracket 40. In this case, a movable bracket which slides in the forward and backward direction may be further provided with the pivot bracket 40, and the location of the movable bracket may be adjusted by moving the cushion in the forward and backward directions.

In one form, a pair of fixation brackets 20 and a pair of guide brackets 30 are provided in front of the base bracket 10 in order to install the tilt unit 100 that mediates the base bracket 10 and the pivot bracket 40, and a pair of extension brackets 50 are provided in the rear of the pivot bracket 40.

The fixation brackets 20 are installed in a manner extending downward while the fixation brackets 20 are spaced from each other in front of the base bracket 10.

Further, the guide brackets 30 extend forward at both edges of the base bracket 10.

In particular, an arc-shaped first guide hole 31 is formed in each guide bracket 30 and extended in the forward and backward directions. In this case, a curvature radius of the first guide hole 31 may be determined based on a tilting curvature of the pivot bracket 40. In addition, an operation range of the pivot bracket 40 when it is tilted is determined by the length of the first guide hole 31 (i.e., the length of the extended hole).

Moreover, the extension brackets 50 are installed in a manner extending downward while being spaced from each other in the rear of the pivot bracket 40.

Meanwhile, the tilt unit 100 tilts the pivot bracket 40 in the forward and backward direction of the base bracket 10 by an influence of a weight of the tilt unit 100 as the center of gravity of the pivot bracket 40 is changed by pivoting of the pivot bracket 40 by mediating the base bracket 10 and the pivot bracket 40. The tilt unit 100 has tilt brackets 110 for the tilt operation.

A pair of tilt brackets 110 elongate vertically and are installed to be spaced apart from each other with a gap corresponding to a gap between the guide brackets 30.

The tilt bracket 110 includes a lower area which is installed on the bottom of the fixation bracket 20 by a tilt shaft 21, and an upper area which is tilted in the forward and backward directions based on the tilt shaft 21. To this end, the upper area of the tilt bracket 110 is tilted while being guided along the guide bracket 30.

Therefore, a first guide bolt 111 which is inserted into the first guide hole 31 and guided along the first guide hole 31 is fixed to the upper area of the tilt bracket 110. As a result, as the guide bolt 111 slides along the first guide hole 31 while being guided in the forward and backward directions, the upper area of the tilt bracket 110 is tilted around the tilt shaft 21 in the forward and backward direction.

In another form, the tilt unit 10 may include a means for reducing a speed at which the tilt bracket 110 is tilted by the guide bracket 30 in the forward and backward direction.

For example, the tilt unit 100 further includes a pair of link brackets 120 connecting the extension bracket 50 and the fixation bracket 20 in a manner of a link structure.

In this case, one side of the link bracket 120 is connected to the extension bracket 50 by a first link bolt 122, and the other side of the link bracket 120 is connected to the fixation bracket 20 by a second link bolt 123. Therefore, the extension bracket 50 and the fixation bracket 20 are connected in the link structure manner by the link bracket 120.

Meanwhile, an arc-shaped second guide hole 112 is formed in an area of the tilt bracket 110 facing the link bracket 120, and the second guide hole 112 is vertically extended along the tilt bracket 110. In this case, the curvature radius of the second guide hole 112 may be determined based on the curvature at which the link bracket 120 operates. Further, as the curvature radius of the second guide hole 112 is changed, the speed at which the tilt bracket 110 is tilted may be controlled. In addition, the operation range of the link bracket 120 is controlled by the length of the second guide hole 112.

In addition, a second guide bolt 121 which is inserted into the second guide hole 112 and guided along the second guide hole 112 is fixed to a middle area of the link bracket 120. As a result, when the pivot bracket 40 pivots upward, the upper area of the tilt bracket 110 is tilted forward while the center of gravity of the pivot bracket 40 moves forward. In this case, the guide bolt 111 is guided forward along the first guide hole 31 and the second guide bolt 121 slides while being vertically guided along the second guide hole 112, and as a result, the speed at which the tilt bracket 110 is tilted in the forward and backward direction is reduced.

Meanwhile, the tilt operation of the pivot bracket 40 is performed in link with the change in center of gravity, which occurs by the pivot operation of the pivot bracket 40, but the pivot operation of the pivot bracket 40 operates by a means for providing separate power.

The power of the operation to pivot the pivot bracket 40 may be provided by various method, for example a driving motor. The driving motor 60 may provide the power desired for actuating the pivot bracket 40 in the fixation bracket 20 and for actuating an actuation rod 70 which is connected to the pivot bracket 40 and pivots the pivot bracket 40 by receiving the power of the driving motor 60.

An actuation state of the leg rest apparatus for a vehicle seat will be described with reference to drawings.

Figure 4A:
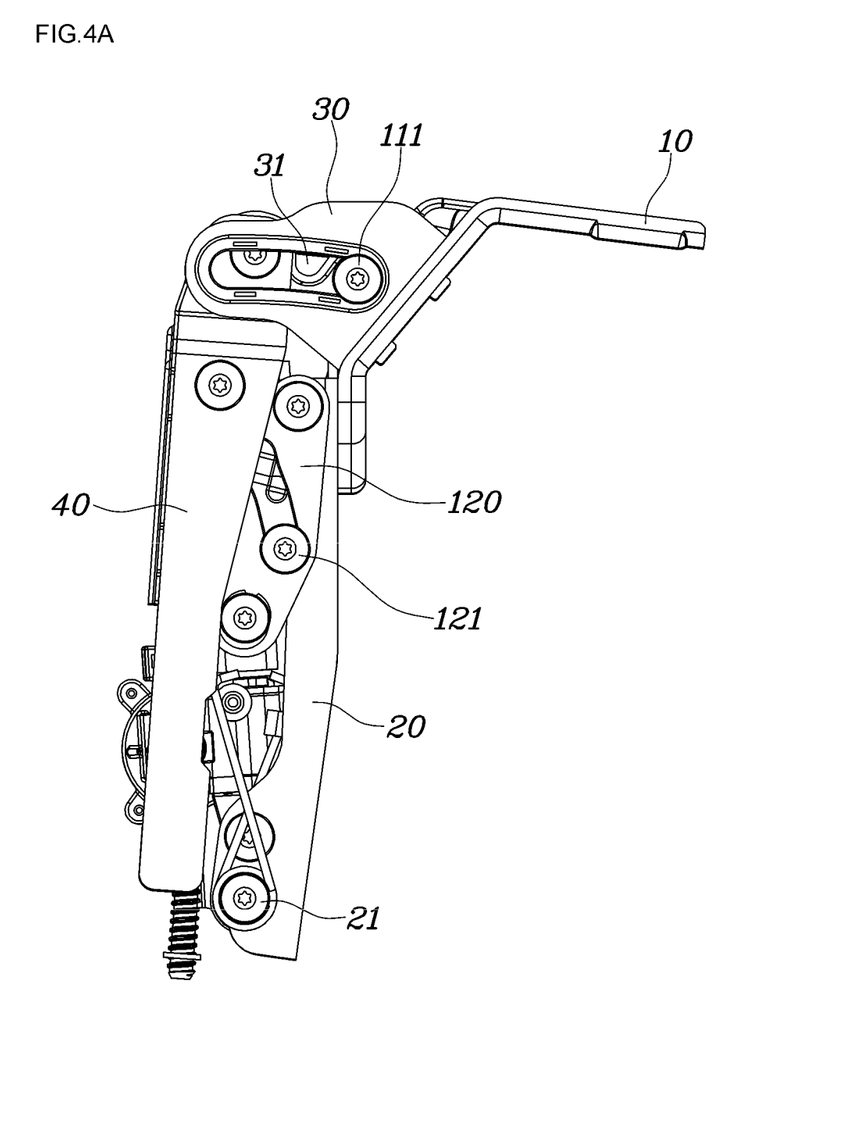
FIGS. 4A to 4C are actuation state diagrams illustrating an actuation state of the leg rest apparatus for a vehicle seat.
Figure 4B:
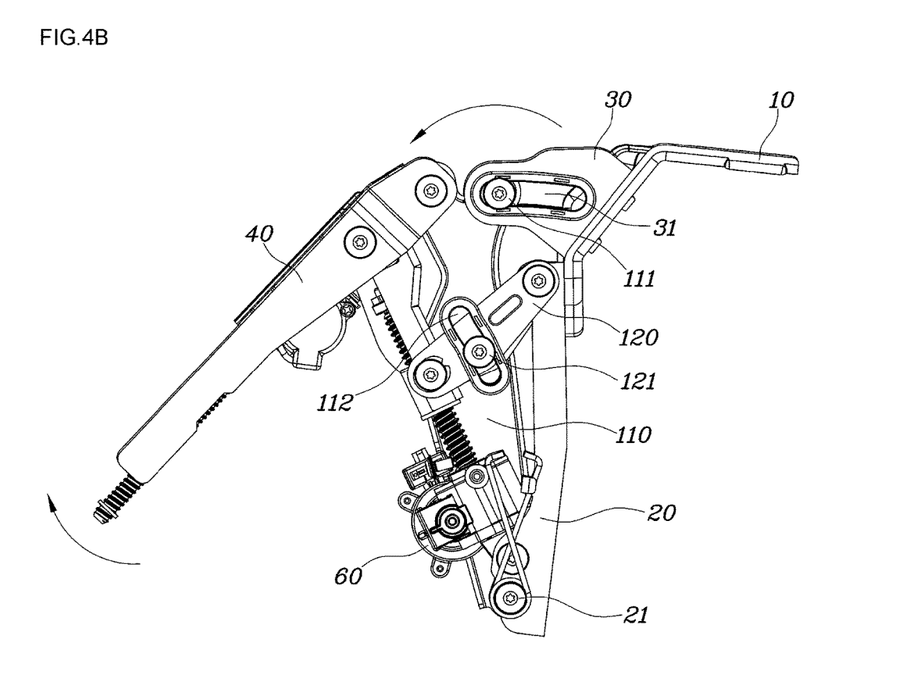
Figure 4C:
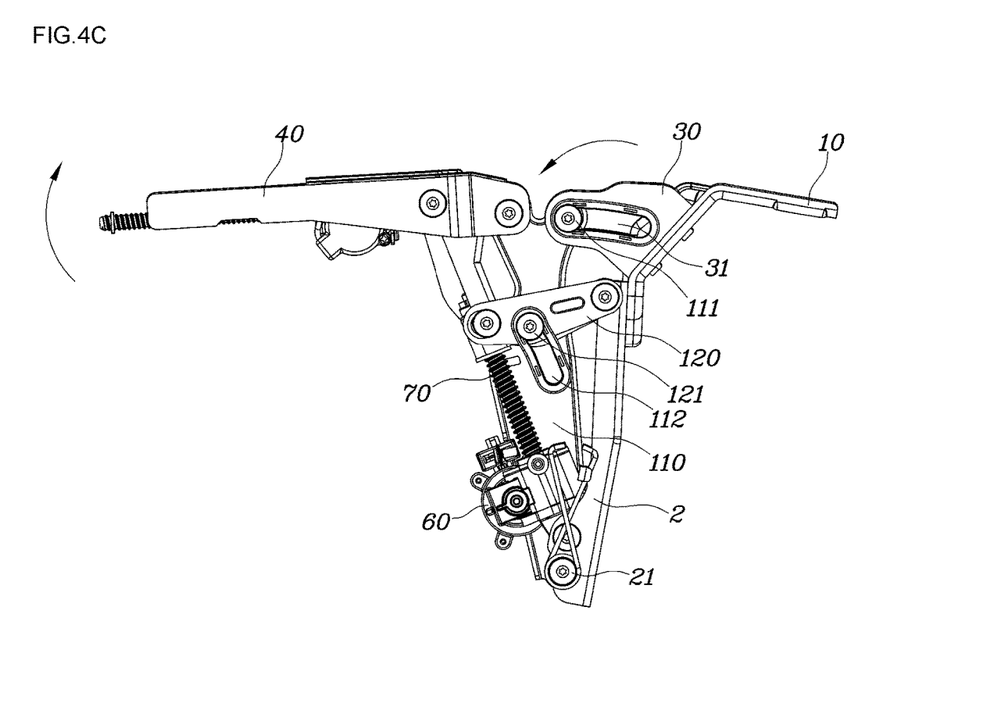

FIGS. 4A to 4C are actuation state diagrams illustrating an actuation state of the leg rest apparatus for a vehicle seat according to the exemplary form of the present disclosure.

First, when power to the pivot bracket 40 upward is transferred to the pivot bracket 40 by the operation of the actuation rod 70 by actuating the driving motor 60 as illustrated in FIG. 4B while the pivot bracket 40 is positioned downward as illustrated in FIG. 4A, the pivot bracket 40 pivots upward.

Then, while the front of the pivot bracket 40 pivots upward, the center of gravity of the pivot bracket 40 moves forward. The tilt bracket 110 is tilted forward by the movement of the center of gravity. In this case, the upper area of the tilt bracket 110 connected to the pivot bracket 40 is tilted forward based on the tilt shaft 21 and the tilt operation is controlled by the operation of the first guide bolt 111 which is guided forward along the first guide hole 31.

Meanwhile, while the tilt operation of the tilt bracket 110 is performed, an attitude of the link bracket 120 is changed and in this case, the second guide bolt 121 provided in the link bracket 120 is vertically guided along the second guide hole 112 formed in the tilt bracket 110. While the operation of the tilt bracket 110 which is tilted forward is controlled by such an operation, the tilting speed is reduced.

In addition, when the driving motor 60 is continuously actuated, the center of gravity of the pivot bracket 40 also moves forward to the maximum while the front of the pivot bracket 40 pivots upward to the maximum as illustrated in FIG. 4C, and as a result, the tilt bracket 110 is also tilted forward to the maximum. In this case, a maximum tilt section in which the tilt bracket 110 is tilted forward is restricted while the first guide bolt 111 is controlled by the end of the first guide hole 31.

Meanwhile, the operation in which the pivot bracket 40 pivots downward is performed in a reverse order to the operation in which the pivot bracket 40 pivots upward.

Although the present disclosure has been described with reference to the accompanying drawings and the aforementioned forms, the present disclosure is not limited thereto. Accordingly, various transforms and modifications of the present disclosure can be made by those skilled in the art within the scope without departing from the technical spirit of the present disclosure.

What is claimed is:

1. A leg rest apparatus for a vehicle seat, comprising:
   a base bracket coupled to a seat cushion frame in front of a seat cushion and having edges at both sides of the base bracket;
   a pivot bracket configured to vertically pivot relative to a front of the base bracket; and
   a tilt unit configured to tilt the pivot bracket in forward and backward directions relative to the base bracket, while a center of gravity of the pivot bracket is changed by pivoting the pivot bracket, and the tilt unit configured to connect the pivot bracket to the base bracket,
   wherein a pair of fixation brackets are provided in front of the base bracket and extend downward while the fixation brackets are spaced from each other,
   a pair of guide brackets, each of which is provided at the edges of the base bracket and extends forward from the respective edges of the base bracket,
   the tilt unit includes a pair of tilt brackets of which lower areas are installed on bottoms of the fixation brackets by a tilt shaft and upper areas are tilted while being guided along the guide brackets, and
   the pivot bracket is connected to a front part of the upper areas of the tilt brackets.

2. The leg rest apparatus of claim 1, wherein an arc-shaped first guide hole is formed in each guide bracket along the forward and backward directions, and
   a first guide bolt configured to insert into the arc-shaped first guide hole and configured to be guided along the arc-shaped first guide hole, the first guide bolt provided in the upper areas of the tilt brackets.

3. The leg rest apparatus of claim 1, wherein a pair of extension brackets are provided in rear of the pivot bracket and extend downward while being spaced from each other,
   the tilt unit further includes a pair of link brackets configured to connect the extension brackets to the fixation brackets, forming a link structure, and
   an operation of the link brackets is controlled by the tilt brackets so that a speed at which the link brackets operate is lower than a speed at which the tilt brackets are tilted while the tilt brackets are tilted in the forward and backward directions.

4. The leg rest apparatus of claim 3, wherein an arc-shaped second guide hole is vertically formed in the tilt brackets, and
   a second guide bolt configured to insert into the arc-shaped second guide hole and configured to be guided along the arc-shaped second guide hole, the second guide bolt provided in a middle area of the link brackets.

5. The leg rest apparatus of claim 1, further comprising:
   a driving motor installed in at least one of the fixation brackets and configured to provide power desired for actuating the pivot bracket; and
   an actuation rod configured to receive the power of the driving motor to pivot the pivot bracket.

* * * * *